(12) United States Patent
Svensson

(10) Patent No.: US 9,539,950 B2
(45) Date of Patent: Jan. 10, 2017

(54) ATTACHABLE FIX POINT STRIP

(75) Inventor: Micael Svensson, Varnamo (SE)

(73) Assignee: Thule Sweden AB, Hillerstorp (SE)

( * ) Notice: Subject to any disclaimer, the term of this patent is extended or adjusted under 35 U.S.C. 154(b) by 466 days.

(21) Appl. No.: 13/700,094

(22) PCT Filed: May 26, 2010

(86) PCT No.: PCT/EP2010/057214

§ 371 (c)(1),
(2), (4) Date: Aug. 14, 2014

(87) PCT Pub. No.: WO2011/147444

PCT Pub. Date: Dec. 1, 2011

(65) Prior Publication Data

US 2014/0346203 A1    Nov. 27, 2014

(51) Int. Cl.
*B60R 9/048* (2006.01)
*B60R 7/10* (2006.01)
*B60R 13/07* (2006.01)
*B60R 9/12* (2006.01)
*B60R 9/058* (2006.01)

(52) U.S. Cl.
CPC .................... *B60R 9/058* (2013.01)

(58) Field of Classification Search
CPC ............ B60R 9/058; B60R 9/048; B60R 7/10; B60R 13/07; B60R 9/12
See application file for complete search history.

(56) References Cited

U.S. PATENT DOCUMENTS

| | | | | |
|---|---|---|---|---|
| 2,253,423 A | * | 8/1941 | Fellers | B60R 7/10 224/311 |
| 2,782,972 A | | 2/1957 | Binding | |
| 3,239,115 A | * | 3/1966 | Bott | B60R 9/12 224/315 |
| 3,931,919 A | * | 1/1976 | Gerber | B60R 9/10 211/22 |

(Continued)

FOREIGN PATENT DOCUMENTS

| | | |
|---|---|---|
| SE | 508709 C2 | 10/1998 |
| WO | 2005061277 A1 | 7/2005 |
| WO | 2011147444 A1 | 12/2011 |

OTHER PUBLICATIONS

International Searching Authority, International Search Report for International Application No. PCT/EP2010/057214, dated May 6, 2011.

(Continued)

*Primary Examiner* — Brian D Nash
(74) *Attorney, Agent, or Firm* — Sterne, Kessler, Goldstein & Fox P.L.L.C.

(57) ABSTRACT

The present invention relates to a fix point strip (20) to provide a provisional fix point position to a grip member (11) of a clamp rack load carrier foot (10), upon attachment to a vehicle (1). The fix point strip (20) comprises an attachment surface (25) for attaching to a surface of said vehicle (1) and a coupling surface (20) for interaction with said grip member (11) of said clamp rack load carrier foot (10). The coupling surface (30) comprises at least one pre determined position for said grip member (11). The present invention provides for a simple and cheap way of introducing a friction enhancing and means for preventing the grip member from being displaced in the event of e.g. a collision with another vehicle.

20 Claims, 3 Drawing Sheets

(56) References Cited

U.S. PATENT DOCUMENTS

| | | | | |
|---|---|---|---|---|
| 4,076,157 A | * | 2/1978 | Hedstrom | B60R 9/058 224/329 |
| 4,505,965 A | * | 3/1985 | Zipperle | B60R 13/07 428/122 |
| 4,516,710 A | | 5/1985 | Bott | |
| 4,586,638 A | | 5/1986 | Prescott et al. | |
| 4,684,049 A | * | 8/1987 | Maby | B60R 9/12 224/320 |
| 4,809,943 A | * | 3/1989 | Taschero | B60R 9/058 224/329 |
| 5,282,562 A | * | 2/1994 | Legault | B60R 9/058 224/326 |
| 5,312,030 A | | 5/1994 | Baravalle | |
| 5,588,573 A | * | 12/1996 | Mann | B60R 9/058 224/325 |
| 5,862,964 A | * | 1/1999 | Moliner | B60R 9/058 224/322 |
| 6,059,159 A | * | 5/2000 | Fisher | B60R 9/00 224/309 |
| 6,516,985 B1 | | 2/2003 | Lundgren | |
| 2005/0275241 A1 | * | 12/2005 | Rothwell | B60R 11/00 296/136.01 |
| 2006/0065686 A1 | * | 3/2006 | Furtado | B60R 9/048 224/319 |
| 2006/0273123 A1 | * | 12/2006 | Settelmayer | B60R 9/045 224/325 |
| 2013/0193177 A1 | * | 8/2013 | Poulsen | B60R 9/058 224/329 |
| 2014/0183235 A1 | * | 7/2014 | Hubbard | B60R 9/058 224/309 |

OTHER PUBLICATIONS

International Searching Authority, Written Opinion for International Application No. PCT/EP2010/057214, dated May 6, 2011.

\* cited by examiner

# ATTACHABLE FIX POINT STRIP

CROSS-REFERENCE TO RELATED APPLICATION

This application is a national phase application of international application no. PCT/EP2010/057214, which has an international filing date of May 26, 2010, and which is entirely incorporated by reference herein.

TECHNICAL FIELD

The present invention relates to an attachable fix point strip which can be attached to a vehicle, such as a car, to provide for a predetermined coupling position to a grip portion of a grip member of a clamp rack load carrier foot.

BACKGROUND OF THE INVENTION

There are generally two different types of load carrier feet used in vehicle roof rack systems. One such type is a load carrier foot which uses a clamping force imparted between a support surface and a gripping member as primary attachment principle. This type of load carrier foot is also referred to as a clamp rack load carrier foot. Load carrier feet used for rails are also considered to be of the clamp rack load carrier foot type.

Another type of load carrier foot is attached on pre prepared positions on the vehicle, which generally do not need to be attached using a clamping force as primary attachment principle. This type of load carrier foot is also referred to as a fix point foot. Fix point foot use a predetermined position, a fixed point, on the vehicle prepared by the vehicle manufacturer during production of the vehicle. Such a fix point, or pre prepared position, can be a nut like member arranged on the chassis of the vehicle as illustrated in the publication of SE 508 709 C2 for example.

During attachment of a load carrier foot of the clamp rack foot type, which uses a clamping force as primary attachment principle to the roof of the vehicle, the load carrier foot rests on the roof and a grip member engages a ledge on the vehicle. The grip member is thereafter forced in a direction so as to impart a clamping force between the grip member and the support surface by means of attachment arrangements, such as a screw, which retains the load carrier foot on the roof of the vehicle. This type of load carrier foot is advantageous as it can be applied to many different types of vehicles and it requires little or no manipulation of the vehicle itself, in contrast to a fix point foot.

One such clamp rack load carrier foot is previously known from U.S. Pat. No. 6,516,985, which discloses a load carrier bar extending transversely over a roof of a vehicle and which is secured to the vehicle at each opposing side edge region thereof by means of a load carrier foot. The load carrier foot, has a support surface for abutment against the roof of the vehicle and a clamping portion for clamping against an edge portion of the roof. A rotary shaft arranged at the end region of the load carrier bar is rotated to impart a clamping force between the support portion and the clamping portion after assembly.

A clamp rack load carrier foot, as compared to the fix point load carrier foot, has the drawback of running the risk of being displaced after assembly to the vehicle, e.g. during a collision. It further has the drawback that it can deform or damage the vehicle and the surface to which it is coupled, if the clamping force is too high. There is thus a need for improvements within this area.

SUMMARY OF THE INVENTION

It is an object of the present invention to solve or at least reduce the drawbacks relating to clamp rack load carrier feet mentioned above, or to provide for a useful alternative to present solutions. This is achieved by an attachable fix point strip adapted to provide a provisional fix point position to a grip member of a clamp rack load carrier foot, upon attachment to a vehicle. The attachable fix point strip comprises an attachment surface for attachment to a surface of the vehicle and a coupling surface for interaction with the grip member of the clamp rack load carrier foot. The coupling surface comprises at least one pre determined position for the grip member.

The present invention provides for a provisional fix point, i.e. a provisional pre determined position for the grip member of the clamp rack load carrier foot. The fix point prevents or reduces the risk that the grip member is displaced during e.g. a collision. Optionally if it is displaced, it provides for an increased or improved clamping force between the grip member and the support surface. It further enables the clamp rack load carrier foot to be coupled using a lower clamping force than what would otherwise be advisable. The attachable fix point strip can be attached to a vehicle by an end user or at the manufacturing site as in optimal conditions; it requires no, or substantially no, manipulation of the vehicle itself.

The present invention can also help an end user when re coupling a vehicle roof rack arrangement. The positioning of a load carrier foot can take effort and time when coupling a vehicle roof rack for the first time. It can thus save both time and effort.

The present invention also provide for a protection layer to the surface of the vehicle.

According to an aspect of the invention, the attachment surface comprises an adhesive material and/or a magnetic material to enable the attachment to the vehicle. Optionally the adhesive material can be applied separately.

According to an aspect of the invention, the coupling surface comprises at least one stop surface, such as at least one crest, which is adapted to interact with the grip member of the clamp rack load carrier foot so as to provide for the pre determined position and to prevent the grip member from being displaced. The at least one crest can be formed by at least one protrusion extending out from the coupling surface. The protrusion can be circular, oval, rectangular, and polygonal formed such as square, triangular, octagonal, etc.

The at least one protrusion is in an embodiment adapted to interact with a corresponding groove, slot or aperture on the grip member of the clamp rack load carrier foot.

According to an aspect the invention, the coupling surface for interaction with the grip member comprises a recess for receiving a part of the grip member.

According to an aspect the invention, the attachable fix point strip is a unitary piece of material. Optionally it can be formed by a plurality of individual components, e.g. as a laminate.

According to an aspect the invention, a first attachable fix point strip is integrally formed with at least a second attachable fix point strip. The first and second attachable fix point strips are separable from each other, e.g. by tearing during which prepared tear cuts are advantageously present, or by cutting. At least the first and second attachable fix point strips advantageously form a continuous strip of a plurality of attachable fix point strips.

According to an aspect the invention, the attachable fix point strip is adapted to be realisably attached to the vehicle, e.g. by using magnetic material as attachment means. The attachable fix point strip is advantageously disposable, i.e. appropriate to dispose in a bin.

According to a second aspect the invention, the invention relates to a load carrier foot comprising a body with a support surface, a grip member and an adjustment arrangement to adjust the position of the grip member with respect to the body. The grip member comprises a grip portion which comprises an attachable fix point strip. The load carrier foot can be arranged on a load carrying bar to which a second load carrier foot is arranged thus forming a vehicle roof rack arrangement.

BRIEF DESCRIPTION OF THE DRAWINGS

The present invention will be described in greater detail with reference to the accompanying figures in which.

DETAILED DESCRIPTION OF PREFERRED EMBODIMENTS

Figure 1:
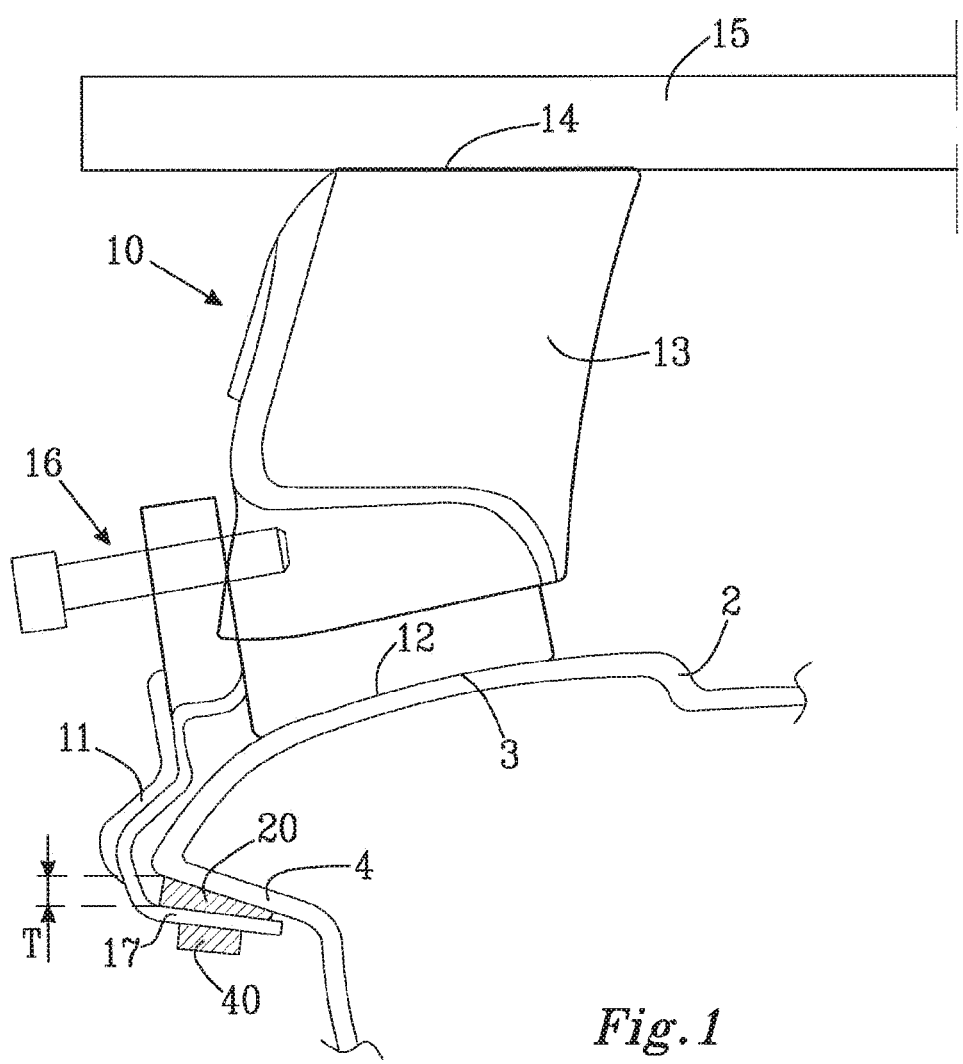
FIG. 1 shows parts of a vehicle roof rack arrangement with a clamp rack load carrier foot used together with an attachable fix point strip, attached to a vehicle.

FIG. 1 shows parts of a vehicle 1 with a roof 2 comprising a resting surface 3 for a clamp rack load carrier foot 10, hereafter referred to only as a load carrier foot. A ledge 4 of the vehicle 1 is adapted to provide for a grip surface to a grip member 11 of the load carrier foot 10. The load carrier foot 10 comprises a grip member 11 adapted to grip the ledge 4 in a retaining manner and together with a support surface 12 of the load carrier foot 10 provide a clamping force there between. The load carrier foot 10 comprises a body 13 having a load carrying bar receiving surface 14 onto which a load carrying bar 15 is positioned so as to form a vehicle roof rack arrangement together with a second load carrier foot (not shown). The load carrying bar 15 extends across the roof 2 of the vehicle 1 and substantially between the longitudinal sides (not shown) of the vehicle 1 in a direction transverse to the longitudinal direction of the vehicle. An adjustment arrangement 16 is adapted to adjust the position of the grip member 11 with respect to the body 13 so as to adjust the clamping force between the grip member 11 and the support surface 12 of the load carrier foot 10.

The support surface 12 can be formed directly by the body 13 or optionally be formed, or complemented, by a flexible friction enhancing material such as a rubber material or rubber like material, nevertheless, it can be said that the body 13 comprises a support surface. The body 13 provides structural integrity to the load carrier foot 10 to enable load to be positioned on the load carrying bar 15.

The grip member 11 of the load carrying foot 10 comprises a grip portion 17 which is adapted to grip the ledge 4 in a retaining manner. Between the grip portion 17 of the grip member 11 and the ledge 4 of the vehicle 1 is an attachable fix point strip 20 arranged. The attachable fix point strip 20 provides for a fix point to the grip member 11 of the load carrier foot 10. Generally, without a fix point strip, the load carrier foot 10 could be positioned at substantially any position along the longitudinal side of the roof 2 of the vehicle 1.

The attachable fix point strip 20 is adapted to be operable with a vehicle 1. Hence an end user could simply attach the attachable fix point strip 20 to the vehicle 1 after he/she bought the vehicle 1. However, a vehicle manufacturer could also use an attachable fix point strip according to the present invention during the manufacturing of the vehicle 1 if desirable. The attachable fix point strip 20 provides for an increased friction between the grip member 11 and the vehicle 1, and additionally it provides for a predetermined position for the grip member 11 to be positioned at, i.e. a fix point. This enables the attachable fix point strip 20 to readily provide for a displacement stop to the grip member 11, effectively preventing or reducing the risk that the grip member 11 could be displaced during e.g. a collision with another vehicle.

Figure 2:
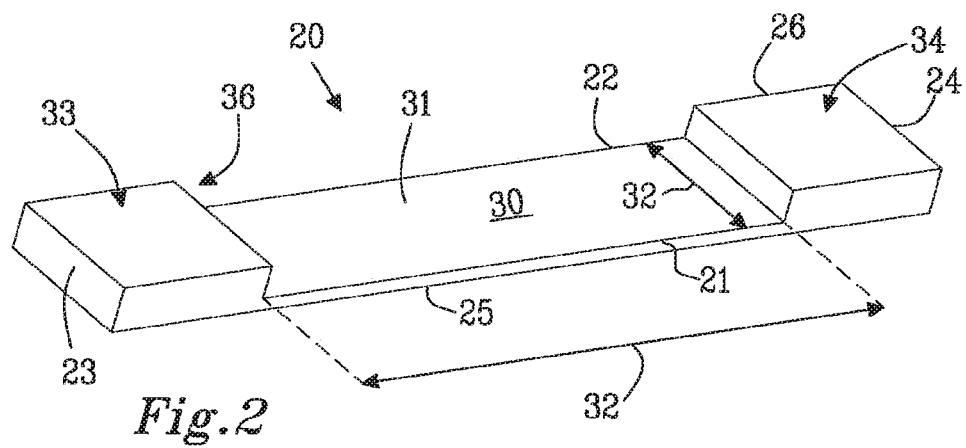
FIGS. 2-5 show different embodiments of an attachable fix point strip according to the present invention.

FIG. 2 shows a first embodiment of the attachable fix point strip 20. The attachable fix point strip 20 comprises a first and a second longitudinal edge 21, 22, a first and a second transverse edge 23, 24, an attachment surface 25 (not shown) and on the opposite side of the attachable fix point strip, a coupling surface 30.

The coupling surface 30 is adapted to receive the grip portion 17 at a predetermined position, i.e. at a fix point. The fix point can be formed by a recess, as shown in FIG. 2, or by protrusions, or combinations thereof. It can also be formed by an area on the coupling surface 30 having an increased friction than the remaining area of the coupling surface.

The attachment surface 25 is adapted to be attached directly to the vehicle 1. The attachable fix point strip 20 can be attached using adhesive, which can be arranged on the attachment surface 25. Optionally the adhesive can be added separately to the attachment surface 25 or to the surface of the vehicle 1. Different adhesives can be used such as hot melt adhesive or multiple component adhesives, generally referred to as two component adhesives. The adhesive can be heat (temperature), water or time activated or activated by other means such as removing a protective cover. Alternatively or as a complement, the attachable fix point strip can comprise a magnetic material which adheres to the vehicle 1 and retains the attachable fix point strip. Other suitable materials are meltable films or the like.

In the embodiment shown in FIG. 2, the coupling surface 30 comprises a recess 31 forming a grip portion receiving area 32, illustrated with the two arrows. The grip portion receiving area 32 is formed between a first and a second stop member 33, 34. The grip portion receiving area 32 extends across the whole coupling surface 30 in the transverse direction. This enables the grip portion 17 of the grip member 11 of the load carrier foot 10 to be positioned to the coupling surface 30 and the grip portion receiving area 32 from two directions, i.e. the attachable fix point strip is less sensitive of how it is applied to the vehicle 1.

The grip portion receiving area 32 is in the order of 50-80% of the total area of the coupling surface 30 in this embodiment.

Figure 3:
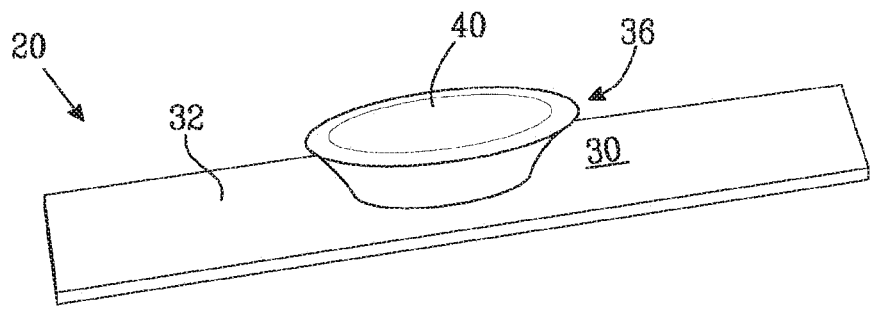

FIG. 3 shows an alternative embodiment of an attachable fix point strip 20 according to the present invention. Same features are illustrated with the same references as above.

Figure 4:
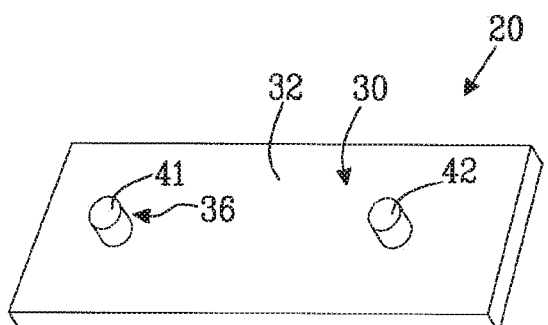
Figure 5:
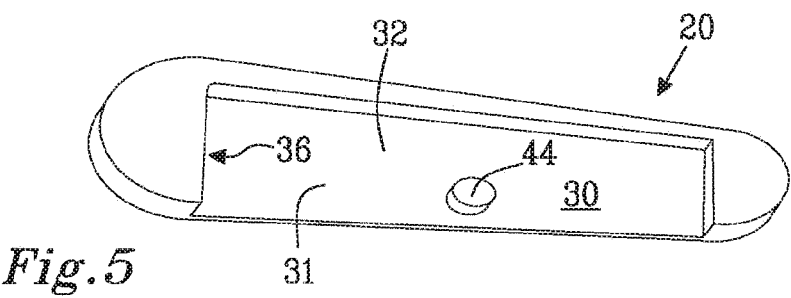
Figure 6:
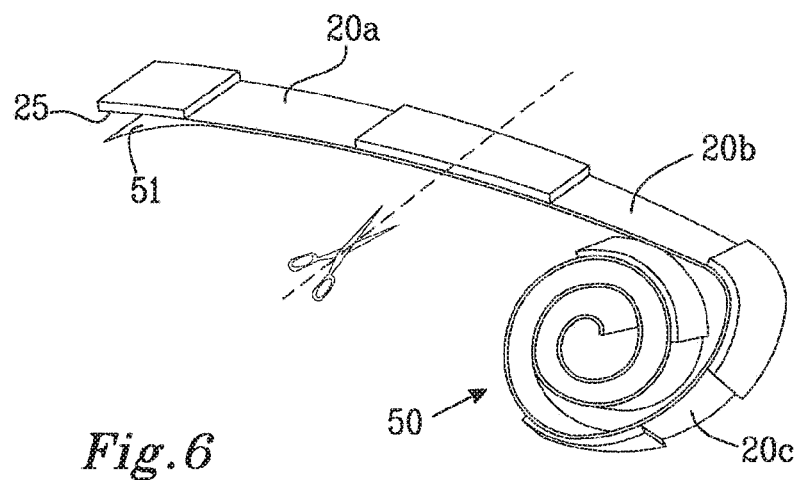
FIG. 6 shows a continuous strip of a plurality of attachable fix point strips, according to the present invention, winded up as a roll.

As is noticed, the coupling surface 30 comprises a single protrusion 40 adapted to interact with an aperture or a slot on the grip portion 17 of the grip member 11 of the load carrier foot 10. The area around the protrusion 40 is in this case the grip portion receiving area 32 and thus the fix point for the grip member 11, i.e. the predetermined position for the grip portion 17 of the grip member 11. Parts of such protrusion 40 can also be seen in FIG. 1. FIG. 4 comprises two protrusions 41, 42 extending out from the coupling surface 30. The area around the protrusions 41, 42 is in this case the grip portion receiving area 32 and thus the fix point for the grip member 11, i.e. the predetermined position for the grip portion 17 of the grip member 11. FIG. 5 shows an embodiment having both a protrusion 43 and a recess 31 on the coupling surface 30.

The fix point for the grip member 11, i.e. the predetermined position for the grip portion 17 of the grip member 11 is that position which the grip portion is intended to be positioned at to achieve a friction enhancement between the grip portion 17 and the vehicle 1 and it includes a stop surface to prevent, or to at least reduce the risk, that the grip member 11 is displaced during a rapid retardation or acceleration of the vehicle 1. The fix point for the grip member 11, i.e. the predetermined position for the grip portion 17 of the grip member 11, is advantageously that position which the grip portion 17 is intended to be positioned so as to maximize the retaining properties of the attachable fix point strip.

The attachable fix point strip is advantageously made in one unitary piece of material. Optionally it can be made a laminate comprising a plurality of material layers.

Advantageously, a plurality of attachable fix point strips can be provided as a continuous strip of material. FIG. 5 shows a schematically illustrated roll 50, comprising a plurality of attachable fix point strips 20*a*, 20*b*, 20*c*. An attachable fix point strip can easily be cut or torn off from the roll 50 before use or before sale in a store or the like. A peelable protective layer 51 can be removed from the attachment surface 25 to expose the adhesive layer arranged on the attachment surface 25. The loose attachable fix point strip can there after be positioned on appropriate place on the vehicle 1 to provide for a provisional fix point for a grip member of a clamp rack load carrier foot.

In FIG. 1, the thickness T of the attachable fix point strip 20 is different along the transverse direction of the attachable fix point strip 20. According to an aspect of the present invention, the attachable fix point strip comprises a unitary thickness in the transverse direction or a varying thickness in the transverse direction of the attachable fix point strip. In the shown embodiment in FIG. 1, the varying thickness in the transverse direction of the attachable fix point strip can compensate for different angles of a ledge 4 of the vehicle 1 with respect to the grip portion 17 of the grip member 11 of the load carrier foot 10. A better a grip is thus achieved at the same time a provisional fix point is provided.

In the embodiments shown in FIGS. 1-6, the attachable fix point strip comprises at least one stop surface, e.g. in the form of a crest 36, which interacts with the grip portion 17 of the grip member 11 to prevent the grip member from being displaced during a rapid retardation or acceleration. An example of a rapid retardation is if the vehicle 1 would collide with another object such as a second vehicle.

Figure 7:
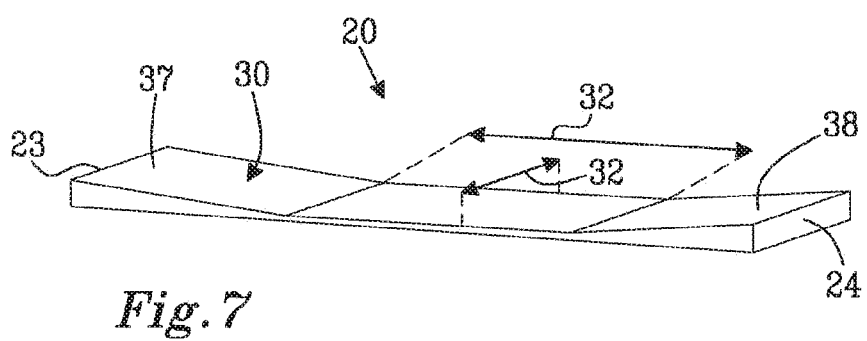
FIG. 7 shows an embodiment of an attachable fix point strip according to the present invention.

FIG. 7 shows an embodiment of an attachable fix point strip 20 having a grip portion receiving area 32 forming a pre determined position 32 for the grip portion 16 of the grip member 11. In FIG. 7 this is indicated with longitudinal and transverse extending arrows 32. The shown attachable fix point strip 20 comprises a first and a second stop member 37, 38. The first and the second stop member 37, 38 comprises a tilting surface which intersects the grip portion receiving area 32 so that the highest point of the first and the second stop members 37, 38 are positioned at each transverse end 23, 24 of the attachable fix point strip 20. The first and the second stop members 37, 38 thus form a first and a second wedge member. During use, if the vehicle 1 collides and the grip portion 16 of the grip member 11 is displaced in the longitudinal direction of the attachable fix point strip 20, the clamping force between the grip portion 16 and the support surface 12 is increased due to the increase in the relative distance there between. The attachable fix point strip 20 of the embodiment shown in FIG. 7 thus provides for a clamping increasing arrangement upon a sudden retardation or acceleration of the vehicle 1. Advantageously the attachable fix point strip comprises at least one wedge member so as to provide for a clamping increasing arrangement upon a sudden retardation or acceleration of the vehicle 1.

An attachable fix point strip according to the present invention is advantageously made from; one or more plastic polymers, such as polyurethane, polypropylene, polyethylene, similar polymers or combinations thereof; metals such as steel, iron, copper, brass, alloys, wood; such as pine, ash, oak, or combinations thereof; carbon fiber based materials; rubber like materials; such as synthetic rubber or natural rubber.

The invention claimed is:

1. A clamp rack load carrier foot, comprising:
   an attachable fix point strip comprising an attachment surface configured to attach to a surface of a vehicle and a coupling surface,
   wherein the clamp rack load carrier foot comprises a body with a support surface configured to contact the surface of the vehicle, a grip member comprising a grip portion configured to contact the coupling surface of the attachable fix point strip, and an adjustment arrangement configured to adjust the position of the grip member with respect to the body,
   wherein the coupling surface of the attachable fix point strip comprises at least one predetermined position for the grip member,
   wherein the attachable fix point strip is configured to provide a provisional fix point position to the grip member upon attachment to the vehicle, and
   wherein the attachment surface of the attachable fix point strip comprises an adhesive material or a magnetic material or both to enable the attachment to the vehicle.

2. The clamp rack load carrier foot according to claim 1, wherein the coupling surface of the attachable fix point strip comprises at least one crest which is configured to interact with the grip member so as to provide for the predetermined position.

3. The clamp rack load carrier foot according to claim 2, wherein the at least one crest is formed by at least one protrusion extending out from the coupling surface.

4. The clamp rack load carrier foot according to claim 3, wherein the at least one protrusion is configured to interact with a corresponding groove, slot, or aperture on the grip member.

5. The clamp rack load carrier foot according to claim 1, wherein the coupling surface of the attachable fix point strip comprises at least one crest which is configured to interact with the grip member so as to provide for the predetermined position.

6. The clamp rack load carrier foot according to claim 1, wherein the coupling surface of the attachable fix point strip for interaction with the grip member comprises a recess for receiving a part of the grip member.

7. The clamp rack load carrier foot according to claim 1, wherein the attachable fix point strip is a unitary piece of material.

8. The clamp rack load carrier foot according to claim 1, wherein the attachable fix point strip is a first attachable fix point strip and is integrally formed with a second attachable fix point strip, the first and second attachable fix point strips being separable from each other.

9. The clamp rack load carrier foot according to claim 8, wherein the first and second attachable fix point strips form a continuous strip of a plurality of attachable fix point strips.

10. The clamp rack load carrier foot according to claim 1, wherein the attachable fix point strip is configured to be releasably attached to the vehicle.

11. The clamp rack load carrier foot according to claim 1, wherein the coupling surface comprises at least one wedge member.

12. The clamp rack load carrier foot according to claim 1, wherein the attachable fix point strip is disposable.

13. The clamp rack load carrier foot according to claim 1, wherein the clamp rack load carrier foot is arranged on a load carrying bar to which a second clamp rack load carrier foot is arranged so as to form a vehicle roof rack arrangement.

14. The clamp rack load carrier foot according to claim 1, wherein the attachment surface of the attachable fix point strip is configured to attach to a first portion of the surface of the vehicle and the support surface of the body of the clamp rack load carrier foot is configured to contact a second portion of the surface of the vehicle.

15. The clamp rack load carrier foot according to claim 14, wherein the first portion of the surface of the vehicle is a roof of the vehicle and the second portion of the surface of the vehicle is an underside of a ledge of the vehicle.

16. A method for attaching a clamp rack load carrier foot to a vehicle, comprising:
providing the clamp rack load carrier foot comprising a body with a support surface, a grip member, and an adjustment arrangement configured to adjust the position of the grip member with respect to the body of the clamp rack load carrier foot;
attaching an attachable fix point strip on a surface of the vehicle;
clamping the clamp rack load carrier foot to the vehicle, wherein the support surface contacts the surface of the vehicle and the grip member contacts the attachable fix point strip such that the attachable fix point strip provides a provisional fix point position to the grip member upon attachment to the vehicle; and
disposing a protrusion on the attachable fix point strip through an aperture in the grip member of the clamp rack load carrier foot.

17. The method according to claim 16, wherein attaching the attachable fix point strip on the surface of the vehicle comprises attaching the attachable fix point strip to an underside of a ledge of a roof of the vehicle.

18. The method according to claim 16, further comprising adjusting the adjustment arrangement to adjust the position of the grip member with respect to the body of the clamp rack load carrier foot.

19. The method according to claim 18, wherein adjusting the adjustment arrangement adjusts a clamping force between the grip member and the support surface of the clamp rack load carrier foot.

20. A clamp rack load carrier foot, comprising:
an attachable fix point strip comprising an attachment surface configured to attach to a surface of a vehicle and a coupling surface,
wherein the clamp rack load carrier foot comprises a body with a support surface configured to contact the surface of the vehicle, a grip member comprising a grip portion configured to contact the coupling surface of the attachable fix point strip, and an adjustment arrangement configured to adjust the position of the grip member with respect to the body,
wherein the coupling surface of the attachable fix point strip comprises at least one predetermined position for the grip member,
wherein the attachable fix point strip is configured to provide a provisional fix point position to the grip member upon attachment to the vehicle, and
wherein the coupling surface of the attachable fix point strip for interaction with the grip member comprises a recess for receiving a part of the grip member.

* * * * *